United States Patent
McDade, Sr.

(10) Patent No.: US 8,055,989 B2
(45) Date of Patent: Nov. 8, 2011

(54) BOOT SECURITY USING EMBEDDED COUNTERS

(75) Inventor: Darryn D. McDade, Sr., Livermore, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 1131 days.

(21) Appl. No.: 11/890,287

(22) Filed: Aug. 3, 2007

(65) Prior Publication Data

US 2008/0040601 A1    Feb. 14, 2008

Related U.S. Application Data

(60) Provisional application No. 60/836,315, filed on Aug. 8, 2006.

(51) Int. Cl.
*G06F 11/10* (2006.01)
*H03M 13/00* (2006.01)

(52) U.S. Cl. .......... 714/807; 714/38; 717/171; 713/176

(58) Field of Classification Search .................. 714/38, 714/807; 717/171; 713/176
See application file for complete search history.

(56) References Cited

U.S. PATENT DOCUMENTS

| | | | |
|---|---|---|---|
| 6,651,188 B2 * | 11/2003 | Harding et al. | 714/38 |
| 7,073,064 B1 * | 7/2006 | Angelo et al. | 713/176 |
| 2005/0229173 A1 * | 10/2005 | Mihm et al. | 717/171 |

* cited by examiner

*Primary Examiner* — Sam Rizk
(74) *Attorney, Agent, or Firm* — Lisa K. Jorgenson; William A. Munck

(57) ABSTRACT

The present disclosure provides a system for providing a security and method of providing an enhanced security booting environment. The system and method includes a basic input/output system (BIOS) stored in memory. The system and method also includes a counter embedded in the memory configured to monitor the number of times each block of the memory has been written. This information could be used with existing error detection mechanisms to improve the ability to detect unintended write operations.

20 Claims, 1 Drawing Sheet

BOOT SECURITY USING EMBEDDED COUNTERS

CROSS-REFERENCE TO RELATED APPLICATION AND CLAIM OF PRIORITY

The present application is related to U.S. Provisional Patent No. 60/836,315, filed Aug. 8, 2006, entitled "Method, Apparatus, and System of Enhancing Boot Security Using Embedded Counters Within a Memory". U.S. Provisional Patent No. 60/836,315 is assigned to the assignee of the present application and is hereby incorporated by reference into the present disclosure as if fully set forth herein. The present application hereby claims priority under 35 U.S.C. §119(e) to U.S. Provisional Patent No. 60/836,315.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The disclosure relates generally to computing platforms, and in particular to security measures in such platforms.

BACKGROUND

Conventional operating systems (OS) typically include at least two modes of operation: a "user" mode of operation and a "kernel" mode of operation.

Operation in "user" mode is generally limited in the scope of their execution permissions. In other words, operations in user mode typically cannot access protected mode hardware, such as the memory management registers of the processor, without causing an exception. This exception is then caught or handled by another piece of code that has higher permission and the ability to evaluate the user code request and accept or reject it.

"Kernel" mode programs, on the other hand, are assumed to be trusted software. Such programs can execute any instruction and reference any memory addresses.

Accordingly, all user mode software must request use of the kernel by means of a system call in order to perform privileged instructions, such as process creation or input/output operations.

Basic input/output system (BIOS) or boot code is a piece of code that is executed when the processor first comes out of reset. The BIOS initializes hardware and prepares for the launch of the operating system (OS). In other words, the BIOS ensures that all other chips, hard drives, ports, central processing units (CPUs) and any other related system hardware function together. If the BIOS is breached, corrupted or otherwise compromised, then potentially the entire system is compromised.

In an effort to make computing platforms more secure, organizations generally implement levels of trust or "trust zones" in the hardware architecture of computing systems. Each zone typically has a set of execution privileges similar to conventional two-ring operating system execution level. Such systems, however, fail to provide security measures related to the BIOS.

There is therefore a need for security measures to validate, protect and otherwise monitor BIOS or boot code.

SUMMARY

Embodiments of the present disclosure generally provide systems and methods for providing security measures to validate, protect and otherwise monitor basic input/output system (BIOS) or boot code.

In one embodiment, the present disclosure provides a method of monitoring basic input/output system (BIOS) stored in memory. The method includes performing a cyclic-redundancy-check (CRC) checksum (or other error detection algorithm) on binary contents of the BIOS. The method also includes comparing the checksum with control values associated with an operating system (OS). The method further includes, if the comparison does not meet predetermined criteria, changing the BIOS to reflect a new checksum value.

In another embodiment, the present disclosure provides a method of providing a security enhanced booting environment. The method includes monitoring a basic input/output system (BIOS) stored in memory and performing a cyclic-redundancy-check (CRC) checksum (or other error detection algorithm) on binary contents of the BIOS. The method further includes comparing the checksum with control values associated with an operating system (OS). The method could also include, if the comparison does not meet predetermined criteria, changing the BIOS to reflect a new checksum value and providing at least one of: a local exception to the BIOS and a remote exception to the BIOS.

In still another embodiment, the present disclosure provides a system for providing a security enhanced booting environment. The system includes a basic input/output system (BIOS) stored in memory. The system also includes a counter embedded in the memory configured to monitor the number of times each block of the memory has been written. The system further includes a circuit to perform a cyclic-redundancy-check (CRC) checksum (or other error detection algorithm) on the BIOS, to compare the checksum with control values associated with an operating system (OS) and, if the comparison does not meet predetermined criteria, to change the BIOS to reflect a new checksum value.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
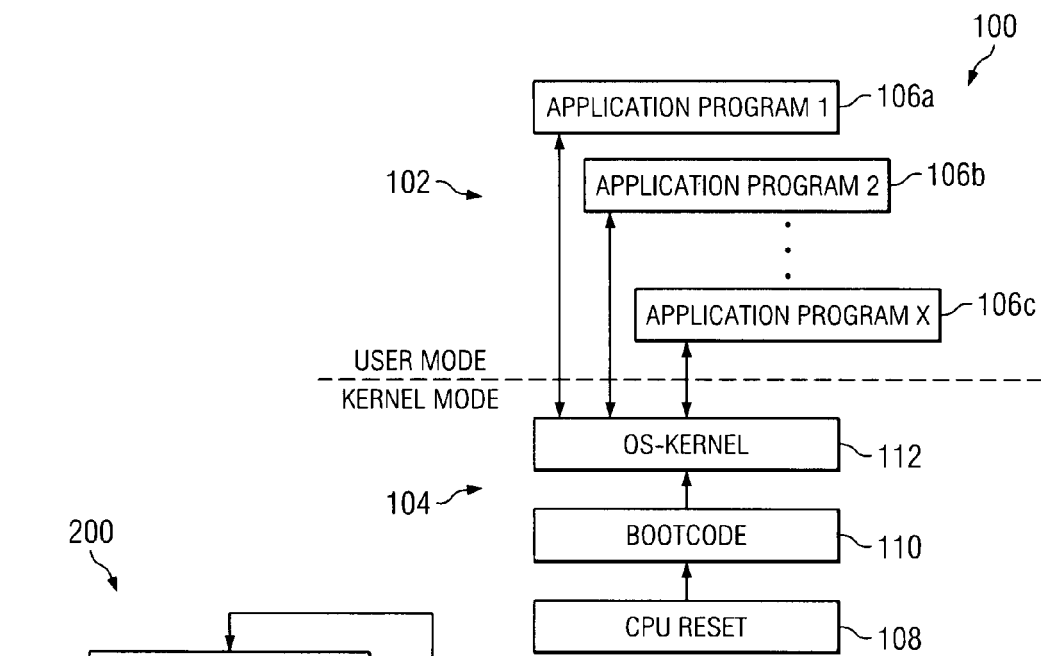
FIG. 1 is a somewhat simplified block diagram illustrating the general architecture of a conventional operating system.

FIG. 1 is a somewhat simplified block diagram illustrating the general architecture of a conventional operating system (OS) 100. The embodiment of OS 100 shown in FIG. 1 is for illustration only. Other embodiments of OS 100 may be apparent without departing from the scope of this disclosure.

OS 100 generally exhibits a "layered" architecture. In one embodiment, OS 100 includes a user mode of operation 102 and a kernel mode of operation 104. OS 100 could be used in any suitable application including, for example, computers, mobile devices, cellular phones and any other device or equipment requiring an operating system.

User mode 102 could include a number of application programs. In the example shown in FIG. 1, user mode 102 includes application program 106*a*, application program 106*b* and application program 106*c*. Application program 106*a*, application program 106*b* and application program 106*c* are sometimes collectively referred to herein as application programs 106.

Although user mode 102 is shown with only three application programs 106, any suitable number of application programs 106 may be associated with user mode 102. In addition, it should be understood that application programs 106 could include any computer program formed from a computer readable program code.

Kernel mode 104 could include a central processing unit (CPU) reset 108, basic input/output system (BIOS) or boot code 110 and OS-Kernel 112. Although kernel mode 104 is shown with only three elements, any suitable number of elements may be associated with kernel mode 104.

CPU reset 108 is generally triggered by the user to reset operating system (OS) 100. In other cases, CPU reset 108 could be triggered by another suitable event internal to OS 100 or by an external trigger.

CPU reset 108 is coupled to BIOS or bootcode 110. BIOS or bootcode 110 generally causes the CPU to execute BIOS or bootcode 110 and/or initializes the associated hardware and prepares OS 100 for launch. BIOS or bootcode 110 is in turn coupled to OS-Kernel 112.

OS-Kernel 112 is in turn coupled to application programs 106. Application programs 106 must request the use of OS-Kernel 112 in order to, for example, perform privileged instructions, such as process creation or input/output operations.

OS 100 provides some level of security by monitoring the activities of application programs 106 running on top of OS 100. If one or more of application programs 106 exhibit prohibited behavior, OS 100 can choose to take action by denying the associated request or addressing the prohibited behavior. OS 100 could accordingly interrupt a selected one of application programs 106. In response, OS 100 could also, for example, request further information from the user or shutdown the relevant application programs 106.

A potential threat, however, lies in the kernel mode of operation 104. For example, if BIOS or bootcode 110 has been compromised, then potentially OS 100 could also be compromised. In one embodiment, a "digital signature" could be created to validate BIOS or bootcode 110 as shown by method 200 in FIG. 2.

Figure 2:
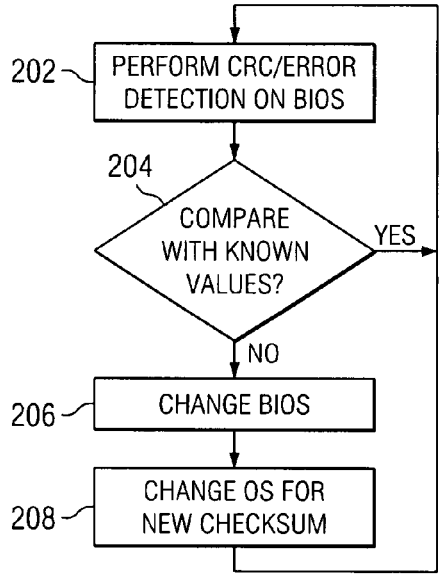
FIG. 2 is a somewhat simplified flow diagram of method 200 for creating a digital signature for a BIOS or boot code according to one embodiment of the present disclosure.

FIG. 2 is a somewhat simplified flow diagram of method 200 for creating a digital signature for a BIOS or boot code according to one embodiment of the present disclosure. The embodiment of method 200 shown in FIG. 2 is for illustration only. Other embodiments of method 200 could be used without departing from the scope of this disclosure.

Method 200 could include, in step 202, performing a cyclic-redundancy-check (CRC) checksum (or other error detection algorithm) on the binary contents of the bootcode, such as BIOS or bootcode 110 shown in FIG. 1 and comparing those values with control values or "good" values in step 204.

If the comparison does not meet predetermined criteria, method 200 may need to change BIOS or bootcode 110 in step 206. For example, the comparison may reveal that BIOS or bootcode 110 needs to upgrade, correct or fix a bug, or otherwise update itself in step 206.

Accordingly, if the BIOS or bootcode 110 changes, code associated with OS 100 would be unable to authenticate itself unless a new code was also sent to OS 100 to inform it of the new CRC checksum. Thus, in step 208, OS 100 is informed of the new CRC checksum and any necessary changes in code associated with OS 100 are made. Thereafter, method 200 could repeat beginning at step 202 immediately or, alternatively, after a predetermined amount of time.

Alternatively, if step 204 in method 200 determines that there is no need for an upgrade, correction or other update to BIOS or bootcode 110, then method 200 again performs a CRC checksum on the binary contents of BIOS or bootcode 110 in step 202 either immediately or, alternatively, after a predetermined amount of time.

Accordingly, in one embodiment, the present disclosure provides a system and method for monitoring BIOS or bootcode 110, detecting whether any changes have occurred using CRC checksum algorithms, and if so, changing the BIOS or bootcode 110 and/or code associated with OS 100 accordingly.

Although method 200 has been described using CRC checksum algorithms, it should be understood that other suitable algorithms, methods or systems could be used to check whether BIOS or bootcode 110 requires upgrading, correcting, fixing or otherwise updating.

Figure 3:
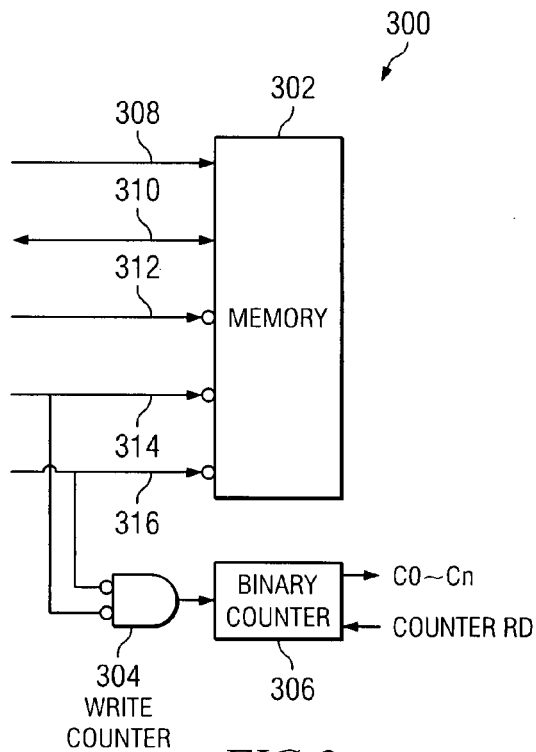
FIG. 3 is a somewhat simplified block diagram of system 300 for generally providing an enhanced security booting environment.

Method 200 described above could be used in a variety of different applications and systems including, for example, system 300 shown in FIG. 3.

FIG. 3 is a somewhat simplified block diagram of system 300 for generally providing an enhanced security booting environment. The embodiment of system 300 shown in FIG. 3 is for illustration only. Other embodiments of system 300 could be used without departing from the scope of this disclosure.

System 300 could include memory block 302, write counter 304 and binary counter 306. Memory block 302 could include any suitable memory including, for example, non-volatile memory such as FLASH memory or NAND memory. Bootup code such as, for example, BIOS or bootcode 110 shown in FIG. 1, could be stored on memory block 302. In one embodiment, both BIOS or bootcode 110 and code relating to OS 100 are stored on memory block 302. Memory block 302 could be divided into writeable sectors to contain the data.

Memory block 302 could be coupled to an address line 308, a data line 310, a memory cache store (CS) line 312, a memory read line 314 and a memory write line 316. Memory block 302 is further coupled to a write counter 304 to detect write cycles to the BIOS or bootcode 110. In one embodiment, write counter 304 is an embedded write counter or a non-volatile write counter.

According to one embodiment, a layer of security could be added to memory block 302. The security measures could keep track of how many times each sector in memory block 302 is written. This information could then be added to the digital signature of either one or both BIOS or bootcode 110 and any code relating to OS 100.

Write counts C0~Cn are available as read only and represent the number of times memory block 302 has been written. OS 100, a monitoring program and/or any other suitable programs can use this non-writeable information to determine if protected blocks of data have been modified by an unauthorized program (as shown in Example Software #1, #2 and #3 found in the Software Appendix herein.).

In one embodiment, each time a block is written, a new series of write count values unique to system 300 and the programs it contains can be created which can be compared to a known good reference value. This enables detection of tampering in BIOS or bootcode 110.

In one example embodiment, assume that memory block 302 includes a 32 Mb×8 writeable memory. In other words, there is about 4 MB of writeable data available in memory block 302. Memory block 302 may erase data in groups of bytes or blocks. In this example, assume that the memory erase block size, EBlkSize, is 256 bytes (EBlkSize=256). Also in this example, suppose that BIOS or bootcode 110 requires BootLoaderSize bytes. As an arbitrary example, suppose BootLoaderSize=3028 bytes.

For the example described above, the number of blocks to erase and write, BlocksRequired, could be 12, which could be obtained by the c++ code fragment found below:

int BootLoaderSize=3028;
    int EBlkSize=256;
    int BlocksRequired=0;
    int remainder=BootLoaderSize % EBlkSize;
    if (remainder)
    remainder=1;
    BlocksRequired=BootLoaderSize/EBlkSize+remainder;

Continuing with the example above, assume further that a two byte (2 byte) counter could be embedded within memory block 302 and keeps track of how many times the memory block 302 has been erased.

An example software model is shown in the Software Appendix herein and is labeled as Software Example #1. An example software model of the implementation of the hardware is shown in the Software Appendix herein and is labeled as Software Example #2. An example test program showing how to use system 300 is shown in the Software Appendix herein and is labeled as Software Example #3. Software Examples #1, 2 and 3 are for illustration purposes only. Other embodiments of Examples #1, 2 and 3 could be used without departing from the scope of this disclosure.

The testapp( ) test application above demonstrates an example instantiation and use of memory block 302 or system 300 according to one embodiment of the present disclosure.

The feature erase_block( ), which can be used when writing to a block of memory 302, may increase the write counter 304. If a malicious application (such as a Trojan, virus, worm, etc.) is able to actually overwrite the BIOS or bootcode 110 in non-volatile memory 302, the sectors it has altered will have their erasecount values incremented from the known good state. This can be detected, and appropriate action can be taken.

Management of this condition may be handled by the application program 106 itself by refusing to continue execution if the writecounters do not correlate to known good or acceptable values. In other words, embodiments of the present disclosure could provide local exception management when writecounter values do not correlate to known good or acceptable values and remote exception management when writecounter values do not correlate to know good or acceptable values.

Accordingly, embodiments of the present disclosure provide a non-volatile memory storage device with embedded counters that monitor the number of times each block of memory has been written. Embodiments of the present disclosure also provide a method of using counter data to verify that sectors have not been modified thereby providing a system and method for creating a security enhanced booting environment.

In one embodiment, the present disclosure provides a system and method of verifying that the sectors containing the image of a program or boot-loader has not been modified and/or a method of notification if the sectors containing the image of a program or boot-loader have been modified.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

SOFTWARE APPENDIX

Software Example #1

```
//===================================================;
// nvm_block.h
//===================================================;
// Purpose:
//       This is a prototype of a block based
//       non-volatile memory storage element.
//       It contains a data store "p_data" and keeps track of
//       the number of times its been erased.
//===================================================;
//
// THIS CODE AND INFORMATION IS PROVIDED "AS IS"
```

-continued

```
// WITHOUT WARRANTY OF ANY KIND, EITHER EXPRESSED OR
// IMPLIED, INCLUDING BUT NOT LIMITED TO THE IMPLIED
// WARRANTIES OF MERCHANTABILITY AND/OR FITNESS FOR A
// PARTICULAR PURPOSE.
//
// Copyright (c) 2006 STMicroelectronics Inc. All Rights
// Reserved.
//
//================================================;
class nvm_block
{
    private:
        unsigned char * p_data;
        unsigned int WriteCount;   // # of times this block
                                   // has been written/erased
        int StorageCapacity;       // # of bytes this hold
    public:
        nvm_block(const unsigned int size );
        ~nvm_block( );
        int block_erase( );
        int write(int address, unsigned char data);
        unsigned char read(int address);
        unsigned int GetWriteCount( ) { return WriteCount;}
};
```

Software Example #2

```
#include "stdafx.h"
#include "nvm_block.h"
//================================================;
// nvm_block.cpp
//================================================;
// Purpose:
//         This is the implementation of a block based non-
//         volatile memory storage element.
//         This model serves as a simulation of a physical
//         memory storage element within a device.
//         It contains a data store "p_data" and keeps track of
//         the number of times its been erased with WriteCount.
//
//================================================;
//
// THIS CODE AND INFORMATION IS PROVIDED "AS IS"
// WITHOUT WARRANTY OF ANY KIND, EITHER EXPRESSED OR
// IMPLIED, INCLUDING BUT NOT LIMITED TO THE IMPLIED
// WARRANTIES OF MERCHANTABILITY AND/OR FITNESS FOR A
// PARTICULAR PURPOSE.
//
// Copyright (c) 2006 STMicroelectronics Inc. All Rights
// Reserved.
//
//================================================;
nvm_block::nvm_block(const unsigned int size ): p_data(0),
WriteCount(0), StorageCapacity(size)
{
    if (!StorageCapacity)
        return;
    p_data = new unsigned char [StorageCapacity];
    if (!p_data)
        throw "SYSERROR: nvm_block memory allocation failure";
    block_erase( );  // Zero out block memory
    WriteCount=0;    // Initialize write count to zero
                     // (it will be one after block_erase( ))
}
nvm_block::~nvm_block( )
{
    if (p_data)
        delete [ ] p_data;
}
int
nvm_block::block_erase( )
{
    ++WriteCount;
    for(int index=0; index<StorageCapacity; index++)
    {
        p_data[index]=0;
    }
    return 0;
}
int
nvm_block::write(int address, unsigned char data)
{
    p_data[address]=data;
    return 0;
}
unsigned char
nvm_block::read(int address)
{
    return p_data[address];
}
```

Software Example #3

```
#include "stdafx.h"
#include "nvm_block.h"
using namespace std;
//================================================;
// nvm_memory.cpp
//================================================;
// Purpose:
//         This software module is a software model/example of
//         a block based non-volatile memory storage device.
//         This device consists of storage elements that are
//         erased in a block fashion and written to in a byte
//         fasion.
//================================================;
//
// THIS CODE AND INFORMATION IS PROVIDED "AS IS"
// WITHOUT WARRANTY OF ANY KIND, EITHER EXPRESSED OR
// IMPLIED, INCLUDING BUT NOT LIMITED TO THE IMPLIED
// WARRANTIES OF MERCHANTABILITY AND/OR FITNESS FOR A
// PARTICULAR PURPOSE.
//
// Copyright (c) 2006 STMicroelectronics Inc. All Rights
// Reserved.
//
//================================================;
#define MAXBLOCKS 128         // 128 arbitrarily chosen
class nvm_memory_device
{
    private:
        int byStorageCapacity;
        unsigned int byBlockSize;
        int NumberOfBlocks;
        nvm_block * p_block[MAXBLOCKS];
    public:
        nvm_memory_device(const int TotalMemorySize,
                                  const int blksize);
        ~nvm_memory_device( );
        unsigned char read(int Address);
        int write(int Address, unsigned char data);
        unsigned int read_erase_counter(int block);
        int erase_block(int block);
        int create_signature( );
        unsigned int get_signature( );
        unsigned int get_lrc( ); // this computes an LRC
                                 //with the value of memory write
        counters
};
nvm_memory_device::nvm_memory_device(const int
    TotalMemorySize, const int BlockSize) :
    NumberOfBlocks(0),byBlockSize(0),byStorageCapacity(0)
{
    byStorageCapacity=TotalMemorySize;    //This chip can
                                          //hold StorageCapacity
                                          bytes
    byBlockSize=BlockSize;
```

```
        if (!byStorageCapacity || !byBlockSize)
        {
            throw "SYSERR: invalid parameter(s)";
            return;
        }
        // NVM's arrange data in blocks, calculate qty of
        // blocks in this memory device
        NumberOfBlocks=TotalMemorySize/BlockSize;
        if (TotalMemorySize%BlockSize)
            ++NumberOfBlocks;
        // create the blocks
        for (int CurrentBlock=0; CurrentBlock<NumberOfBlocks;
                CurrentBlock++)
        {
            p_block[CurrentBlock]=new nvm_block(BlockSize);
            if (!p_block[CurrentBlock])
            {
                NumberOfBlocks=CurrentBlock;  // remember qty
                                              // allocated before
                    abort!
                throw "SYSERROR: nvm_memory_device memory
                    allocation failure";
                break;
            }
        }
    }
    nvm_memory_device::~nvm_memory_device( )
    {
        if (NumberOfBlocks)
        {
            for (int CurrentBlock=0;
                CurrentBlock<NumberOfBlocks; CurrentBlock++)
                delete p_block[CurrentBlock];    // free heap for
                                                 // this element
        }
    }
    unsigned char
    nvm_memory_device::read(int Address)
    {
        // Translate the address--determine its block location
        int block_number=Address/byBlockSize;
        int block_address=Address%byBlockSize;
        return p_block[block_number]->read(block_address);
    }
    int
    nvm_memory_device::write(int Address, unsigned char data)
    {
        // Translate the address--determine its block location
        int block_number=Address/byBlockSize;
        int block_address=Address%byBlockSize;
        return p_block[block_number]->write(block_address,data);
    }
    unsigned int
    nvm_memory_device::read_erase_counter(int block)
    {
        if (block<NumberOfBlocks)
            return p_block[block]->GetWriteCount( );
        else
            throw "SYSERROR: nvm_memory_device block number
                invalid";
    }
    int
    nvm_memory_device::erase_block(int block)
    {
        return p_block[block]->block_erase( );
    }
    unsigned int
    nvm_memory_device::get_lrc( )
    {
        unsigned int LRC=0;
        for (int index=0; index<NumberOfBlocks; index++)
            LRC^=p_block[index]->GetWriteCount( );
        return LRC;
    }
    unsigned int
    nvm_memory_device::get_signature( )
    {
        // Example embodiement of the algorithm:
        //   In this case a signature is created, which in this
        //   embodiment is an LRC created from using the write
        //   counters in the sectors that have been used.
        //   Any other signatures could be used, such as a
        //   CRC-16/CRC-32 created in a similar way, a hash,
        //   or a signature made up from all of the
        //   written data itself (as long as it incorporated
        //   the writecounts from each sector).
        return get_lrc( );
    }
    //   Test Application for class   //
    int const BootLoaderSize=256*99+2; //a test case
    int const EBlkSize=256;
    int testapp( );
    int testapp( )
    {
        unsigned char * pdata=new unsigned char [BootLoaderSize];
        for (int index=0; index<BootLoaderSize; index++)
        {
            pdata[index]=(char) (index&0xff);    // just test
            //data: stuff numbers into an array and use
            //it for data
        }
        // create a memory storage device
        nvm_memory_device memory(BootLoaderSize,EBlkSize);
        cout << "writing data: size = "<<BootLoaderSize<<endl;
        // fill it up with data
        for (int index=0; index<BootLoaderSize; index++)
        {
            memory.write(index,index&0xff);
        }
        cout << "verifying data ..."<<endl;
        // now see if the memory device works by
        // comparing what was written to what was read
        bool verify_passed=true;
        for (int index=0; index<BootLoaderSize; index++)
        {
            if (memory.read(index) != pdata[index])
            {
                // The memory device fails
                cout << "verify failed" << endl;
                verify_passed=false;
                break;
            }
        }
        // provide status report to user
        if (verify_passed==true)
            cout << "verify passed on " << BootLoaderSize <<
                " bytes" << endl;
        int erasecount=memory.read_erase_counter(0);
        int initial_erase_count=erasecount;
        cout << "erase count=" << erasecount<<endl;
        cout << "eraseing device" << endl;
        memory.erase_block(0);
        erasecount=memory.read_erase_counter(0);
        cout <<"erase count=" << erasecount<<endl;
        if (erasecount > initial_erase_count)
            cout << "erase count test passed" << endl;
        else
            cout << "erase count test failed" << endl;
        cout << "eraseing device again "<<endl;
        memory.erase_block(1);
        memory.erase_block(1);
        memory.erase_block(1);
        memory.erase_block(1);
        memory.erase_block(3);
        cout << "Get lrc returned " << memory.get_lrc( ) << endl;
        cout << "done" <<endl;
        delete [ ] pdata;
        return 0;
    }
```

What is claimed is:

1. A method of monitoring basic input/output system (BIOS) stored in memory, the method comprising:

performing a cyclic-redundancy-check (CRC) checksum on binary contents of the BIOS;

generating a write count representing a number of times that one or more blocks of the memory have been written;

comparing the checksum and write count with control values associated with an operating system (OS); and if the comparison does not meet predetermined criteria, changing the OS control values to reflect a new CRC checksum value.

2. The method of claim 1, further comprising:
if the comparison does not meet the predetermined criteria, changing program code associated with the OS according to the new CRC checksum value.

3. The method of claim 1, further comprising:
periodically performing the CRC checksum on the binary contents of the BIOS; and
comparing the checksum and write count with control values associated with an OS.

4. The method of claim 1, further comprising:
if the comparison meets the predetermined criteria, performing a second CRC checksum on the binary contents of the BIOS.

5. The method of claim 1, further comprising assessing whether the BIOS requires at least one of: an upgrade, an update and a correction.

6. The method of claim 1, further comprising:
if the comparison does not meet the predetermined criteria, providing a local exception to the BIOS.

7. The method of claim 1, further comprising:
if the comparison does not meet the predetermined criteria, providing a remote exception to the BIOS.

8. The method of claim 1, further comprising:
providing a notification if the comparison reveals that the memory containing the BIOS has been modified.

9. The method of claim 1, further comprising:
combining a write count for each of the one or more blocks of the memory.

10. The method of claim 1, further comprising:
using one or more embedded counters in the memory to generate the write count.

11. A method of providing a security enhanced booting environment, the method comprising:
monitoring a basic input/output system (BIOS) stored in memory;
performing a cyclic-redundancy-check (CRC) checksum on binary contents of the BIOS;
generating a write count representing a number of times that one or more blocks of the memory have been written;
comparing the checksum and write count with control values associated with an operating system (OS); and
if the comparison does not meet predetermined criteria, changing the OS control values to reflect a new CRC checksum value and providing at least one of: a local exception to the BIOS and a remote exception to the BIOS.

12. The method of claim 11, further comprising:
if the comparison does not meet the predetermined criteria, changing program code associated with the OS according to the new CRC checksum value.

13. The method of claim 11, further comprising:
periodically performing the CRC checksum on the binary contents of the BIOS; and
comparing the checksum and write count with control values associated with an OS.

14. The method of claim 11 further comprising:
if the comparison meets the predetermined criteria, performing a second CRC checksum on the binary contents of the BIOS.

15. The method of claim 11, further comprising assessing whether the BIOS requires at least one of: an upgrade, an update and a correction.

16. The method of claim 11, further comprising:
combining a write count for each of the one or more blocks of the memory.

17. The method of claim 11, further comprising:
using one or more embedded counters in the memory to generate the write count.

18. A system for providing a security enhanced booting environment for a basic input/output system (BIOS) stored in memory, the system comprising:
a counter embedded in the memory, the counter configured to monitor a number of times that one or more blocks of the memory have been written; and
a circuit configured to;
perform a cyclic-redundancy-check (CRC) checksum on the BIOS,
generate a write count from a value of the counter,
compare the checksum with control values associated with an operating system (OS), and,
if the comparison does not meet predetermined criteria, change the OS control values to reflect a new CRC checksum value.

19. The system of claim 18, wherein, when the comparison does not meet the predetermined criteria, the circuit is further configured to provide at least one of: a local exception to the BIOS and a remote exception to the BIOS.

20. The system of claim 18, wherein the circuit is further configured to assess whether the BIOS requires at least one of: an upgrade, an update and a correction.

* * * * *